(12) United States Patent
Schnase et al.

(10) Patent No.: US 11,720,539 B1
(45) Date of Patent: Aug. 8, 2023

(54) SYSTEM AND METHOD FOR PROVIDING A CLIMATE DATA INTERCOMPARISON AND ANALYTICS SERVICE APPLICATION PROGRAMMING INTERFACE

(71) Applicant: United States of America as represented by the Administrator of NASA, Washington, DC (US)

(72) Inventors: John L. Schnase, Greenbelt, MD (US); Daniel Q. Duffy, Greenbelt, MD (US); Glenn S. Tamkin, Falls Church, VA (US); Jian Li, Falls Church, VA (US); Savannah L. Strong, Falls Church, VA (US); Roger Gill, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 749 days.

(21) Appl. No.: 16/730,405

(22) Filed: Dec. 30, 2019

Related U.S. Application Data (63) Continuation-in-part of application No. 14/711,137, filed on May 13, 2015, now Pat. No. 10,339,114.

(51) Int. Cl.
*G06F 16/23* (2019.01)
*G06N 20/00* (2019.01)
*G06N 7/00* (2023.01)
*G06F 16/25* (2019.01)
*G06F 9/54* (2006.01)

(52) U.S. Cl.
CPC .......... *G06F 16/2365* (2019.01); *G06F 9/541* (2013.01); *G06F 16/258* (2019.01); *G06N 7/005* (2013.01); *G06N 20/00* (2019.01); *G06T 2207/30192* (2013.01)

(58) Field of Classification Search
CPC .... G06F 16/2365; G06F 9/541; G06F 16/258; G06N 7/005; G06N 20/00; G06T 2207/30192
See application file for complete search history.

(56) References Cited

U.S. PATENT DOCUMENTS

| | | | |
|---|---|---|---|
| 2004/0024984 A1* | 2/2004 | Lanzatella | G06F 3/0635 711/202 |
| 2007/0260621 A1* | 11/2007 | Smolen | G06F 16/2308 |
| 2011/0106617 A1* | 5/2011 | Cooper | G06Q 30/02 707/E17.014 |
| 2013/0036117 A1* | 2/2013 | Fisher | G06F 16/435 707/736 |

(Continued)

*Primary Examiner* — Tuan C Dao
(74) *Attorney, Agent, or Firm* — Christopher O. Edwards; Trenton J. Roche (57) ABSTRACT

A climate data intercomparison and analytics service application programming interface (CDIAS-API) includes a set of basic utilities configured to map calls from client applications to single service-side methods operating on one or more disparate climate reanalysis datasets by the climate data intercomparison and analytics service, a set of extended utilities comprising scripts that call on one or more of a set of canonical operations, and one or more basic utilities, and a collections reference model configured to provide semantic alignment of variable names, method alignment of statistical operations, and output data format consistency for operations across the one or more disparate climate reanalysis datasets.

12 Claims, 9 Drawing Sheets

(56) References Cited

U.S. PATENT DOCUMENTS

| | | | | |
|---|---|---|---|---|
| 2013/0268357 A1* | 10/2013 | Heath | G06Q 10/10 | 726/26 |
| 2013/0346043 A1* | 12/2013 | Mewes | G06F 30/20 | 703/2 |
| 2014/0156806 A1* | 6/2014 | Karpistsenko | H04L 67/2885 | 709/219 |
| 2014/0288850 A1* | 9/2014 | Avigdor | G05B 15/02 | 702/19 |
| 2015/0106078 A1* | 4/2015 | Chang | G06F 16/35 | 704/9 |
| 2015/0170288 A1* | 6/2015 | Harton | G06Q 40/08 | 705/4 |

* cited by examiner

```
EXTENDED UTILITIES, 420

AVG (Collections, <PARAMETERS>)
BEGIN
  ORDER (Collections, GetVarByCollection(AVERAGE),<PARAMETERS>)
  LOOP UNTIL FINISHED
    STATUS(Collections, ID)
  DOWNLOAD(Collections, ID)
END
```

SYSTEM AND METHOD FOR PROVIDING A CLIMATE DATA INTERCOMPARISON AND ANALYTICS SERVICE APPLICATION PROGRAMMING INTERFACE

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

FIELD

The present disclosure relates to providing access to climate data and more specifically to a climate data intercomparison and analytics service application programming interface (API) for accessing an ensemble of climate data reanalysis collections.

BACKGROUND

Climate models generate data that are of great value to society. Climate model outputs include retrospective analyses that model the historical state of the climate, estimates of current climate conditions, and projections of future climate conditions. The data sets generated by climate models are too large to be moved from the archives where they are stored to end users where the data are typically analyzed and used. Offering climate data analytics as a service makes it easier to access climate model data and perform data analyses where the data are stored before moving reduced, more usable products to the end user for further study.

The NASA Modern-Era Retrospective Analysis for Research and Applications (current version: MERRA-2) is a climate reanalysis dataset of great value to society. The MERRA-2 dataset integrates global data from a variety of satellite systems with numerical models to produce a temporally and spatially consistent synthesis of climate variables that are not easily observed. The MERRA-2 dataset covers the modern era of remotely sensed data, from 1979 to the present. The breadth of MERRA-2 variables, which include atmosphere, ocean, and land surface products, makes the MERRA-2 dataset ideal for investigating climate variability and for use in an expanding array of applications areas, such as national disasters, civil engineering, ecological forecasting, health and air quality, water resources, and agriculture, for example.

A data analytics platform has been developed that provides a distributed file system for storing MERRA-2 datasets, and provides high performance operations for operating on the MERRA-2 datasets. The data analytics platform generally includes a sequencer that transforms the climate data, a desequencer that transforms serialized block compressed sequence files between data formats, a services library of applications that dynamically create data objects from the data as reduced final results, and a utilities library of software applications that process flat serialized block compressed sequence files. The data analytics platform also includes a service interface through which a client device can access the climate data via the data analytics platform. A web based API has also been developed specifically to enable access to the MERRA-2 reanalysis data.

However, there are a multitude of other reanalysis collections available including, for example, the European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), and Japanese 55-year Reanalysis (JRA-55). Currently, the ability of end users, applications, climate researchers, or members of the public to gain meaningful access to an ensemble of the climate data analytics systems mentioned above is limited in that there is no API available for gaining access to the capabilities afforded by an ensemble of reanalysis collections including, for example, one or more of the NASA Modern-Era Retrospective Analysis for Research and Applications (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), Japanese 55-year Reanalysis (JRA-55), or other suitable reanalysis collections.

SUMMARY

It would be advantageous to provide a climate data intercomparison and analytics service with an API that supports operations across disparate climate data collections from different sources with different formats, variables, geographical and spatial domains, temporal resolutions, and other differences, while incorporating new operations for intercomparison purposes, including semantic alignment of variable names, method alignment of statistical operations, and output data format consistency.

In at least one aspect, the disclosed embodiments are directed to a climate data intercomparison and analytics service application programming interface (CDIAS-API), including a set of basic utilities configured to map calls from client applications to single service-side methods operating on one or more disparate climate reanalysis datasets by the climate data intercomparison and analytics service, a set of extended utilities comprising scripts that call on one or more of a set of canonical operations and one or more basic utilities, and a collections reference model configured to provide semantic alignment of variable names, method alignment of statistical operations, and output data format consistency for operations across the one or more disparate climate reanalysis datasets.

In at least one other aspect, the disclosed embodiments are directed to a method of providing a CDIAS-API, including implementing a set of basic utilities configured to map calls from client applications to single service-side methods operating on one or more disparate climate reanalysis datasets by the climate data intercomparison and analytics service, implementing a set of extended utilities comprising scripts that call on one or more of a set of canonical operations and one or more basic utilities, and implementing a collections reference model configured to provide semantic alignment of variable names, method alignment of statistical operations, and output data format consistency for operations across the one or more disparate climate reanalysis datasets.

In at least one other aspect, the disclosed embodiments are directed to a system for providing climate data intercomparison and analytics services including a processor, and a non-transitory computer readable storage medium storing instructions which when executed by the processor, cause the system to convert a plurality of disparate reanalysis collections from different sources to a common format using individual conversion utilities configured to convert a specific one of the plurality of disparate climate reanalysis datasets from different sources to common format files that are temporally and spatially registered, and instantiate a CDIAS-API having a set of basic utilities configured to map calls from client applications to single service-side methods operating on one or more disparate climate reanalysis datasets by the climate data intercomparison and analytics service, a set of extended utilities comprising scripts that call on one or more of a set of canonical operations and one or more basic utilities, and a collections reference model configured to provide semantic alignment of variable names, method alignment of statistical operations, and output data format consistency for operations across the one or more disparate climate reanalysis datasets.

DETAILED DESCRIPTION

A system, method and computer-readable storage device are disclosed which deliver a climate data intercomparison and analytics service with an API that enables intercomparison and analytics operations to be performed over disparate data collections from different sources and provides a collections reference model. The API may be instantiated in a Python distribution package containing client utilities that encapsulate web service calls to the climate data intercomparison and analytics service. The collections reference model provides for semantic alignment of variable names, method alignment of statistical operations, and provides a consistent output data format. Various modifications and changes may be made to the disclosed embodiments without departing from the broader spirit and scope of this disclosure.

Figure 1:
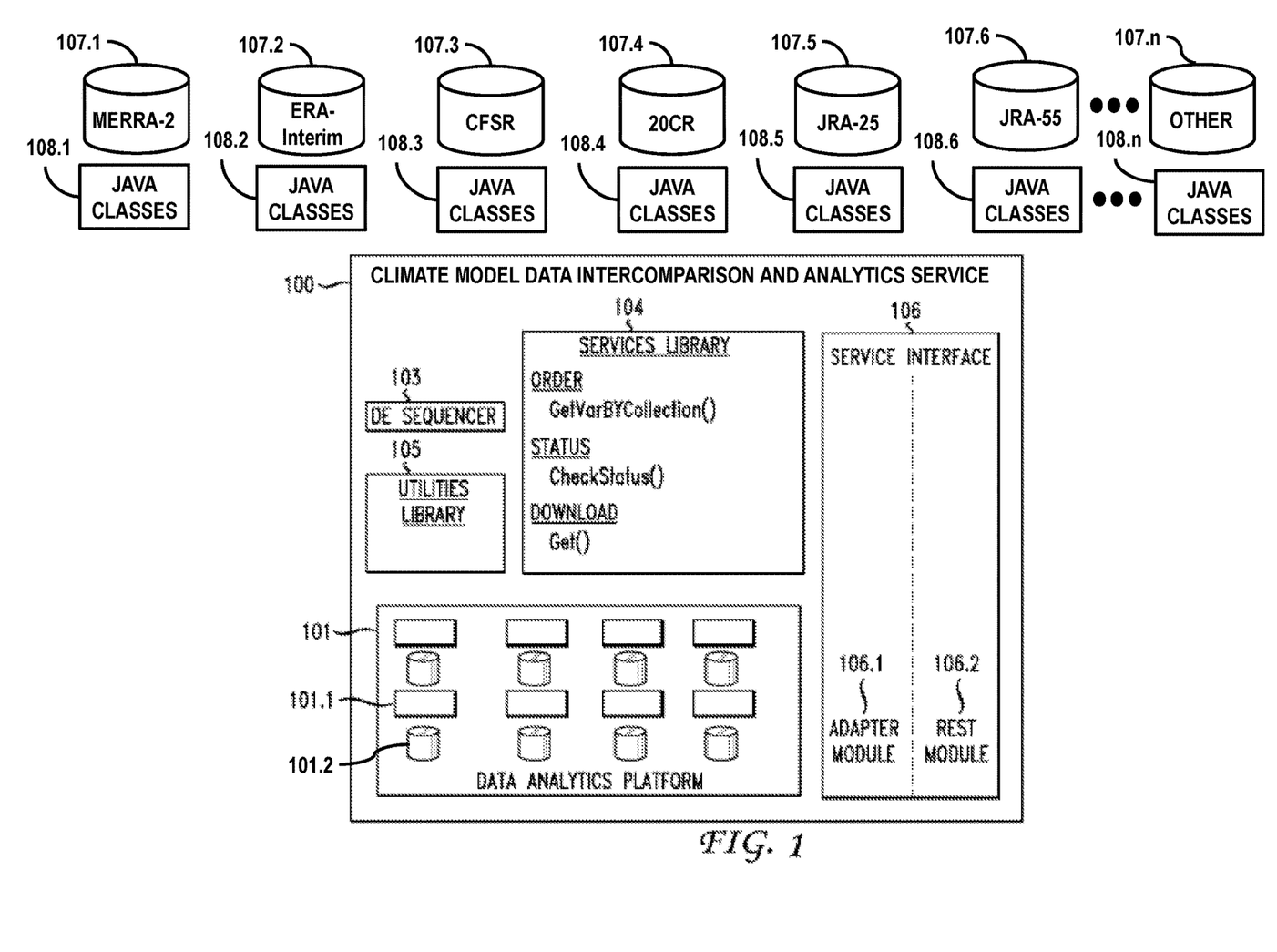
FIG. 1 shows a diagram of an example of system implementing a climate data intercomparison and analytics service according to the disclosed embodiments.

FIG. 1 illustrates the overall organization of an example system 100 implementing a climate data intercomparison and analytics service. The system 100 may implement the service utilizing a high-performance data analytics platform 101, a desequencer 103, a services library 104, a utilities library 105, and source data from one or more disparate climate data collections in any combination, 107.1-107.$n$, for example, MERRA-2, ERA-Interim, CFSR, 20CR, JRA-25, and JRA-55, a set of conversion utilities 108.1-108.$n$, and a service interface 106. The components of the service may be implemented in software or hardware or any combination of software and hardware. For purposes of the present disclosure the disclosed embodiments may be referred to as a climate data intercomparison and analytics service and a climate data intercomparison and analytics system, interchangeably. It should be understood that the listing of disparate climate data collections from different sources is exemplary and that the system may operate over any suitable climate data collection.

The high-performance data analytics platform 101 can include data 101.1 originally sourced from the one or more of the climate data collections and can include one or more data storage devices 101.2. The high-performance data analytics platform 101 provides the storage and compute capabilities required to run the system. The climate data intercomparison and analytics service can support parallel operations, for example, parallel operations utilizing MapReduce analytics; however, alternative configurations are possible so long as they enable high-performance, parallel computing over a distributed file system, for example, a Hadoop file system, and provide the software tools needed to support parallel operation code sets, for example, MapReduce code sets, that implement the capabilities of the system 100.

The desequencer 103 generally operates to transform the flat, serialized block compressed climate data collections sequence files stored in the distributed file system back into common format files and move them out of the distributed file system for consumption by a calling program.

The services library 104 may include a plurality of software applications that dynamically create data objects from the data stored in the distributed file system. The services library can provide an order capability in the form of a Get Variable By Collection (GetVarByCollection( . . . )) method that can implement a number of commonly-used canonical operations over one or more of the MERRA-2, ERA-Interim, CFSR, 20CR, JRA-25, and JRA-55 reanalysis collections. The services library 104 may also include a status operation including a CheckStatus method that checks on progress of an order request according to user-specified input parameters including a unique session identifier for the target order request. The status operation can return outputs including a unique session identifier for the status session, a one word status update of the session identified by the input session identifier, and a detailed description of a target session. The services library 104 may further include a download operation including a Get method to download a data object that has been dynamically created by an order request according to user-specified input parameters including a unique session identifier for a target order request and an optional name for a resulting data object. The output can be the resulting data object.

The services library 104 can be a set of Java classes which implement the capabilities of the services corresponding to the International Organization for Standards (ISO) Open Archival information System (OAIS) Reference Model data flow categories for an operational archive. Such capabilities include "ingest" capabilities to input data objects to the service, "query" capabilities that retrieve metadata relating to data objects in the service, "order" capabilities that dynamically create data objects in the service, "download"

capabilities that retrieve data objects from a service, "execute" capabilities that initiate service-definable operations, and "status" capabilities that check the progress of an order operation.

The utilities library 105 generally includes a plurality of software applications that can process the flat serialized block compressed sequence files. Several example software applications that can be included in the utilities library are provided herein. One example software application is a sorting application that sorts <key, value> pairs of the sequence files by time and grouped by a main variable field. Other example software applications can include a comparing application that compares variable name and associated timestamps of the <key, value> pairs, and sorts operations over the <key, value> pairs by comparing variable name and grouping variables by variable name, a partitioning application that partitions results from a mapper based on a variable name across a plurality of reducer applications, enabling parallel execution of the reducer applications, a simplifying application that simplifies sequencing and desequencing operations by abstracting operations on the <key, value> pairs from a main code of a MapReduce software application, and a managing application that manages configuration files required to execute MapReduce software applications.

The source data generally originates from the disparate climate data collections, 107.1-107.n, for example, MERRA-2, ERA-Interim, CFSR, 20CR, JRA-25, and JRA-55. The MERRA-2 climate reanalysis dataset is produced by NASA's Goddard Earth Observing System Data Assimilation System Version 5 (GEOS-5) in an HDF-EOS format, which is an extension of the Hierarchical Data Format Version 4 (HDF-4). The ERA-Interim climate reanalysis data are available in GRIB format on a Gauss grid with the resolution N128. The CFSR and 20CR reanalysis data are available in GRIB-2 format, except for the initial condition data which are in native binary formats. Spanning 1958-present, JRA-55 is the longest third-generation reanalysis. Compared to the previous generation Japanese Meteorological Agency (JMA) reanalysis, JRA-25, JRA-55 uses a more advanced data assimilation scheme. JRA-25 and JRA-55 both use the GRIB-2 format.

The set of conversion utilities 108.1-108.n may each be configured to convert a specific one of the plurality of disparate climate reanalysis datasets from different sources to common format files that are temporally and spatially registered, to transform the common format files into the flat, serialized block compressed sequence files required by the parallel operation programs, and to load the sequence files into the distributed file system. In order to execute the parallel operations on the data of the variety of climate data collections, the data first need to be ingested into the distributed filesystem of the compute-storage platform. The climate reanalysis datasets are generally disparate in that they may have different formats, variables, geographical and spatial domains, temporal resolutions, and other differences. The MERRA-2 climate reanalysis dataset is produced by NASA's Goddard Earth Observing System Data Assimilation System Version 5 (GEOS-5) in an HDF-EOS format, which is an extension of the Hierarchical Data Format Version 4 (HDF-4). The ERA-Interim climate reanalysis data are available in GRIB format on a Gauss grid with the resolution N128. The CFSR and 20CR reanalysis data are available in GRIB-2 format, except for the initial condition data which are in native binary formats. Spanning 1958-present, JRA-55 is the longest third-generation reanalysis. Compared to the previous generation Japanese Meteorological Agency (JMA) reanalysis, JRA-25, JRA-55 uses a more advanced data assimilation scheme. JRA-25 and JRA-55 both use the GRIB-2 format.

The system can convert these disparate source files to common format files, for example, Network Common Data Format (NetCDF) files, used by many applications. NetCDF is a self-describing format that includes both data and metadata. For NetCDF, MapReduce, Hadoop based systems, individual sets of conversion utilities 108.1-108.n specific to each reanalysis data collection may be utilized for each climate data collection to convert the NetCDF source files into the flat, serialized block compressed sequence files required by MapReduce programs and to load the sequence files into the Hadoop filesystem (HDFS). The sequence files may be encoded, for example, in one of Bloom, Sequence, or Map file formats.

Figure 2:
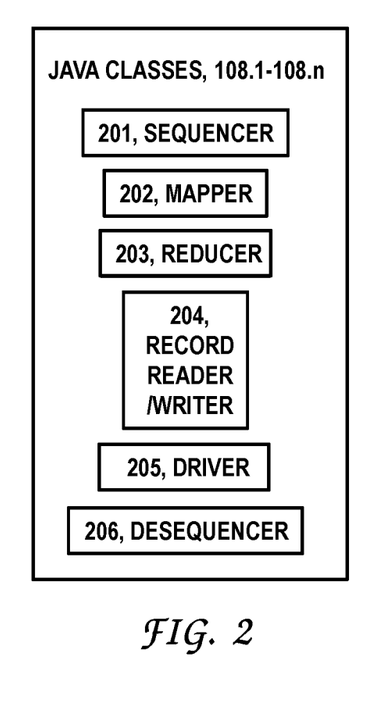
FIG. 2 illustrates individual sets of conversion utilities which may be utilized to convert source files of individual climate data collections to flat, serialized block compressed sequence files.

As shown in FIG. 2, the individual conversion utilities may include a sequencer utility 201 to temporally and spatially register the raw data and convert the raw data of each of the disparate climate reanalysis datasets to a MapReduce-consumable input format, a mapper class 202 to filter and combine input sequence records, a reducer class 203 to aggregate and transform filtered input records into sequence file output format, a record reader/writer utility 204 for HDFS input/output used by the mapper 202 and reducer 203, a driver class 205 to orchestrate the application at runtime, and a de-sequencer utility 206 to convert reduced sequence files The system can create a single custom sequence file for each NetCDF file, wherein the source file's data are logically stored as <key, value> pairs within the resulting sequence file. As a result, each sequence file has a one-to-one mapping to the original NetCDF file. One benefit of this approach is that NetCDF metadata is preserved within the sequence file.

The sequencer utility 201 can operate on a variety of common climate data file formats. The sequence files may be produced by the sequencer utility 201 as Hadoop map files and can be encoded in a variety of common sequence file formats, including Bloom, Sequence, and Map formats. The sequencer utility 201 may partition native climate data collection files by time such that each record in the sequence file may include a composite key including a timestamp and climate variable name that is associated with a value that is the value of the named climate variable. Similarly, the sequencer utility 201 can partition native climate data collection files by other criteria, such as by location, by size, by type, etc., and may temporally and spatially register the data files, with the corresponding changes in the composite key. Depending on the variable and collection type, the variable can represent either a two- or three-dimensional quantity. The sequencer utility 201 can also implement a variety of functions to support the primary capabilities of the sequencer utility 201, such as data preparation and formatting.

In operation, the mapper class 202 may operate to filter each sequence file to capture <key, value> pairs that match the variable and time span of interest. The mapper class may also compare sequence file <key, value> pairs to input selection criteria and pass climate variable values to the reducer class 203 to perform a specified operation. In this case, the reducer module can receive as input <key, value> pair from the mapper module, perform the specified operation on input climate variable values, and write results to a sequence file. The mapper class 202 may also map inputs to a primary node of the data analytics platform into smaller sub-problems, distribute the smaller sub-problems to secondary nodes, process the smaller sub-problems on the secondary nodes such that the smaller sub-problems are processed in parallel, and collect results of the smaller sub-problems into dynamically created data objects that represent reduced final results.

The reducer class 203 may perform calculations based on input parameters and creates new subsets of the filtered sequence files to be stored in the HDFS. The resulting sequence files may then be transformed back into NetCDF by the de-sequencer utility 206 which may transform the flat, serialized block compressed climate data collection sequence files stored in the HDFS back into NetCDF files and move them out of the HDFS for consumption by a calling program. The system 100 can sequence and desequence this binary, multidimensional NetCDF data in an improved manner. The conversion utilities may be implemented as Java classes, however, it should be understood that any variety of alternative approaches may be used.

Returning to FIG. 1, the service interface 106 provides a portal through which a client device can access the disparate climate data collections 107.1-107.n via the services library 104. The service interface 106 can include an adapter module 106.1 that maps service requests from external client software applications to specific capabilities of the data analytics service, and a representational state transfer (REST) server module 106.2 that communicatively links the data analytics service to external client software applications. The adapter module 106.1 can be based on International Organization for Standardization (ISO) Open Archival Information System (OAIS) Reference Model categories. The REST server module 106.2 can communicate with the external client software applications through ISO OAIS Reference Model-based uniform resource locators. In an exemplary embodiment, the RESTful interface 106.2 may be implemented as a PHP program. The communications protocol implemented by the RESTful service may also be based on the OAIS Reference Model's data flow categories.

The climate data intercomparison and analytics system services library 104 may include a collection of methods that implement the core capabilities of the system, such as the order method, status method, and download method described above. The functional capabilities of the service may correspond to the Open Archival Information System (OAIS) Reference Model data flow categories of an operational archive. The OAIS-based capability categories used to organize a service's methods can include operations such as ingest, query, order, download, execute, and status. Ingest methods input objects into the system. Query methods retrieve metadata relating to data objects in the service. Order methods dynamically create data objects. Download methods retrieve objects from the service. The execute and status categories accommodate the dynamic nature of a climate data analytics as a service-type archive. Execute methods initiate service-definable operations that can extend the functionality of a service, and status methods check on the progress of running operations.

In the system 100, the climate data intercomparison and analytics system services library 104 may include the OAIS categories of ingest, query, order, download, execute, and status. An exemplary order method may be a Get Variable By Collection (GetVarByCollection( . . . )) method that can implement a number of commonly-used canonical operations over one or more of the MERRA-2, ERA-Interim, CFSR, 20CR, JRA-25, and JRA-55 reanalysis collections. The arguments for the GetVarByCollection( . . . ) method may include one or more of the reanalysis collections upon which to operate, a temporal and three dimensional spatial extent, the canonical operation to be performed, and any additional parameters needed by the operation.

Exemplary canonical operations may include, for example, maximum, minimum, sum, count, average, variance, and difference, operations. Additional exemplary canonical operations that may be used over the one or more reanalysis collections may include:

Maxm2s—Seasonal maximum, meaning: converting monthly data to seasons (spring-March, April, May; summer-June, July, August; etc.), then selecting the maximum for each grid of 30+ years. The output may include one time step, and a spatial extent as per a user request;

Avgm2s—Seasonal average, meaning: converting monthly data to seasons. Output contains multiple steps as time-span defined;

Vavg—Vertical average, meaning: averaging across vertical levels;

Aavg—Spatial average, meaning: averaging over certain spatial-extent;

Anomaly—In particular, time anomaly, meaning: deviation at certain time step versus long—term average;

Std—Standard deviation, a typical statistic measure to quantify the amount of variation of a set of data values;

The output of the GetVarByCollection( . . . ) method can include a unique session identifier for the order session that can be used to retrieve session status information and download results.

The climate data intercomparison and analytics service's GetVarByCollection( . . . ) method may implement its operations using MapReduce, wherein mapper and reducer programs direct the parallel subsetting and execution of the operations over the climate collection data stored in the analytic platform's Hadoop filesystem. The system 100 can perform subsetting and other operations in an improved manner. The climate data intercomparison and analytics service's status and download capabilities are implemented by the service library's CheckStatus ( . . . ) and Get ( . . . ) methods. These methods can be used to check on the progress of a running order operation and download the computed results when the operation finishes. The services library 104 may be implemented as Java classes, however, it should be understood that any variety of alternative approaches may be used.

The utilities library 105 may include anomaly detection and uncertainty quantification utilities as will be explained in detail below. Similar to the services library 104, the utilities library 105 may be implemented as Java classes, however, it should be understood that any variety of alternative approaches may be used.

In at least one embodiment, the climate data intercomparison and analytics service 100 may be implemented as a Platform As A Service, that is, a cloud based service, packaged as containers that include code, libraries, and other required dependencies in standalone executable packages. The containers may implement a common packaging approach and typically operate in the same manner regardless of the host operating system or the underlying infrastructure. Docker® is an exemplary tool that may be used for creating, deploying, and running container based applications. The NASA General Application Platform (NGAP) is an exemplary cloud-based Platform-as-a-Service (PaaS) and Infrastructure-as-a-Service (IaaS) that may be suitable for providing the climate data intercomparison and analytics service 100. The NASA Advanced Data Analytics Platform (ADAPT) is another cloud-based PaaS and IaaS that may also be suitable for providing the climate data intercomparison and analytics service 100.

Figure 3:
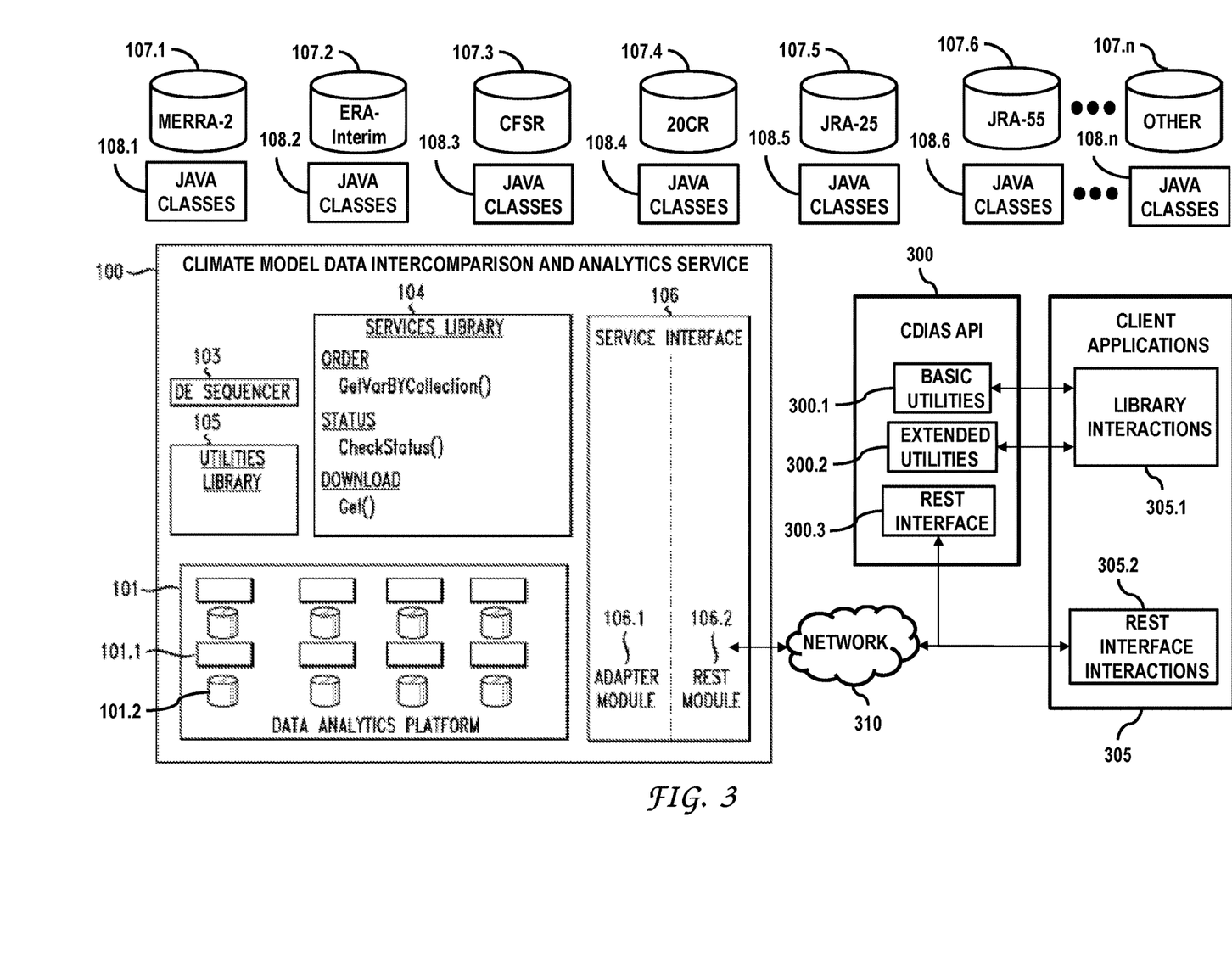
FIG. 3 illustrates an overall architecture of the climate data intercomparison and analytics service incorporating an example of a climate data intercomparison and analytics service API.

FIG. 3 illustrates an overall architecture of the climate data intercomparison and analytics service 100 incorporating a climate data intercomparison and analytics service API 300. The climate data intercomparison and analytics service API (CDIAS API) 300 provides an interface between client applications 305 and the climate data intercomparison and analytics service 100 through a network 310. The architecture of the climate data intercomparison and analytics service 100 can be extended by adding services to the climate data intercomparison and analytics service 100 and exposing the new services through the CDIAS API 300. In this example, the client applications 305 may include library interactions 305.1 that interact with basic 300.1 and extended 300.2 utilities of the CDIAS API 300, and REST interface interactions 305.2 that may make direct calls to the REST server module 106.2 of the climate data intercomparison and analytics service 100.

The direct calls to the REST server module 106.2 may include direct calls to the canonical operations that operate over the MERRA-2, ERA-Interim, CFSR, 20CR, JRA-25, and JRA-55 disparate reanalysis collections, for example, maximum, minimum, sum, count, average, variance, difference, seasonal maximum, seasonal average, vertical average, spatial average, time anomaly, standard deviation, and any other canonical operations. The direct calls may also implement OAIS Reference Model data flow capabilities in the form of web services that may be recognizable by the service interface 106, for example, "ingest" (http://<base_URL>/(ingest.php?service=<service_name>&request=<operation>&parameters=<parameters>), "query" (http://<base_URL>/(query.php?service=<service_name>&request=<operation>&parameters=<parameters>), "order" (http://<base_URL>/(order.php?service=<service_name>&request=<operation>&parameters=<parameters>), "download" (http://<base_URL>/(download.php?service=<service_name>&request=<operation>&parameters=<parameters>), "execute" (http://<base_URL>/(execute.php?service=<service_name>&request=<operation>&parameters=<parameters>), and "status" (http://<base_URL>/(status.php?service=<service_name>&request=<operation>&parameters=<parameters>).

Climate data intercomparison and analytics service capabilities are made available to the CDIAS API 300 through the climate data intercomparison and analytics service interface 106 and the CDIAS API's REST interface 300.3. The REST module 106.2 in combination with the adapter module 106.1 maps service requests to specific operations implemented by the climate data intercomparison and analytics service. The CDIAS API's REST interface 300.3 operates to wrap the climate data intercomparison and analytics service Web services endpoints into the library methods of the CDIAS API's basic utilities 300.1. The CDIAS API's extended utilities 300.2 may operate to combine various utility functions for enhanced operations.

Figure 4:
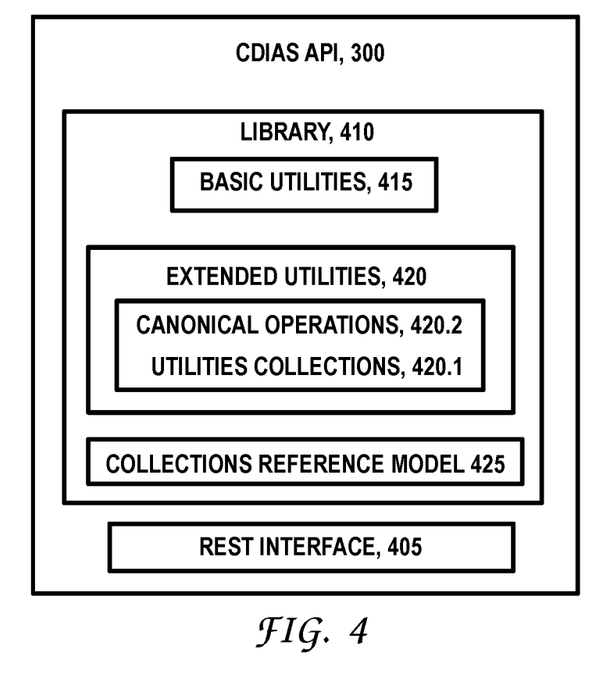
FIG. 4 shows a block diagram of an example of the climate data intercomparison and analytics service API.

FIG. 4 shows a block diagram of the CDIAS API 300. The CDIAS API 300 may include a RESTful communications interface 405 and a library 410. The RESTful communications interface 405 operates to connect the CDIAS API 300 to the REST module 106.2 of the climate data intercomparison and analytics service 100 and to the client applications 305. The library 410 includes programs that enable the client applications 305 to invoke the capabilities of the climate data intercomparison and analytics service 100. The library 410 may further include a collection of basic utilities 415, an optional set of extended utilities 420, and a collections reference model 425. The CDIAS API 300 generally operates to abstract inbound and outbound web service traffic into the functions provided by the library 410. The organization of the API's library into basic 415 and extended 420 utilities, and the collections reference model 425 enables improved functionality. The CDIAS API's architecture enables client-side extensibility, making it easy for users to fashion more complex operations from basic and extended utilities. Further, the communications protocol implemented by the RESTful communications interface 405, like the functional organization of the API's utilities, may also be based on the OAIS Reference Model's data flow categories.

Figure 5:
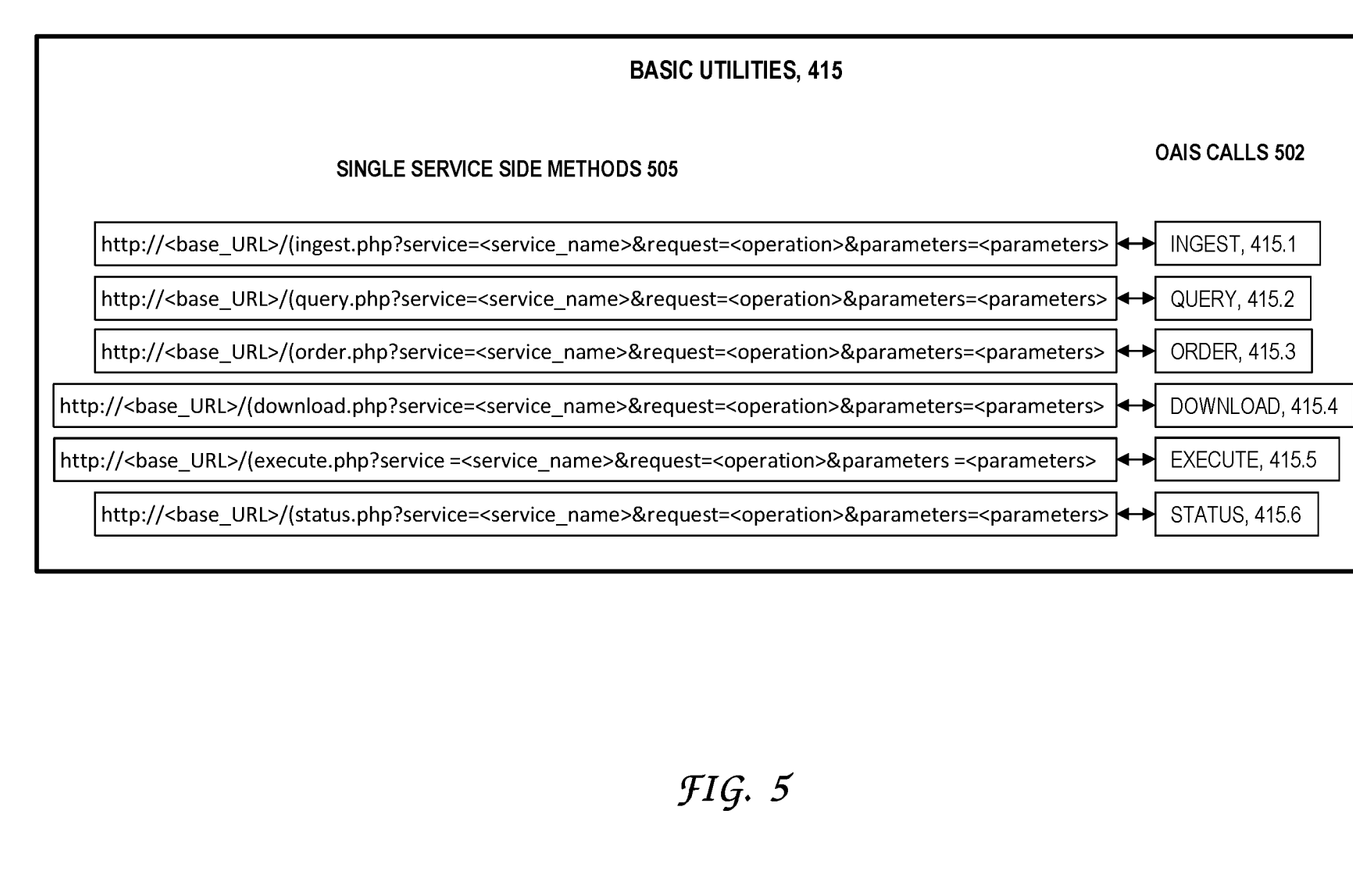
FIG. 5 shows an exemplary mapping of calls from a client application to methods implemented by the climate data intercomparison and analytics service.

As shown in FIG. 5, the basic utilities 415 may generally map OAIS calls 502 from the client applications 305 to single service-side methods 504 implemented by the climate data intercomparison and analytics service 100. In one or more embodiments, the basic utilities may correspond to the OAIS Reference Model data flow categories of an operational archive, having the form of a service name, a specified operation, and operational parameters, where the operational parameters specify which of the disparate reanalysis collections, MERRA-2, ERA-Interim, CFSR, 20CR, JRA-25, and JRA-55, on which to operate, The OAIS calls initiated by the client applications 305 may include, for example, the ingest 415.1, query 415.2, order 415.3, download 415.4, execute 415.5, and status 415.6 methods discussed above. The basic utilities 415 provide a one-to-one correspondence to the ingest, query, order, download, execute, and status web service calls to the following web services recognized by the service interface 106: http://<base_URL>/(ingest.php?service=<service_name>&request=<operation>&parameters=<parameters>, http://<base_URL>/(query.php?service=<service_name>&request=<operation>&parameters=<parameters>, (http://<base_URL>/(order.php?service=<service_name>&request=<operation>&parameters=<parameters>, http://<base_URL>/(download.php?service=<service_name>&request=<operation>&parameters=<parameters>, (http://<base_URL>/(execute.php?service=<service_name>&request=<operation>&parameters=<parameters>, and http://<base_URL>/(status.php?service=<service_name>&request=<operation>&parameters=<parameters>.

The basic utilities 415 allow client applications to bind to the library 410 and use the basic utilities 415 to call services that operate in parallel and asynchronously over any number of the MERRA-2, ERA-Interim, CFSR, 20CR, JRA-25, and JRA-55 disparate reanalysis collections.

In contrast, the extended utilities 420 may include scripts or programs that call on any combination of the canonical operations, the basic utilities 415, and the OAIS web services recognized by the service interface 106 to perform a specific task or create higher order products. The scripts or programs of the extended utilities 420 may operate over any combination of the MERRA-2, ERA-Interim, CFSR, 20CR, JRA-25, and JRA-55 disparate reanalysis collections and generally include arguments or parameters specifying which collections, variables, geographical and spatial domains, temporal resolutions, and other aspects of the disparate reanalysis collections on which to operate.

Figure 6:
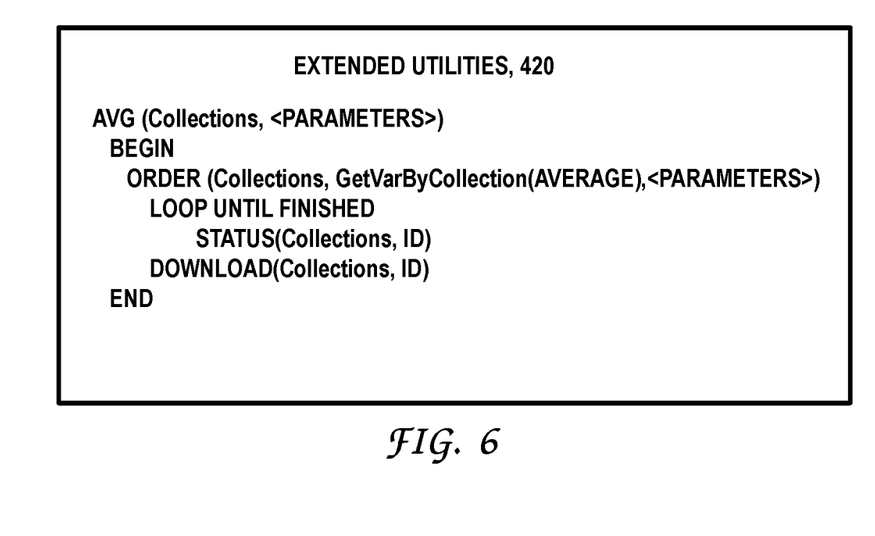
FIG. 6 illustrates an example of how extended utilities of the API may be utilized with disparate reanalysis collections.

FIG. 6 illustrates an example of how the extended utilities 420 may be utilized with the disparate MERRA-2, ERA- Interim, CFSR, 20CR, JRA-25, and JRA-55 reanalysis collections. This example shows how the extended utilities apply programmatic control to the basic utilities' independent order, status, and download methods to create a simple client-side average method that would cause the climate data intercomparison and analytics system to respond by computing the average value of a variable over a specified set of reanalysis collections and over a specified spatial and temporal extent and return a result to the client application.

As mentioned above, the CDIAS API 300 may further include a collections reference model 425. The collections reference model 425 provides for semantic alignment of variable names, method alignment of statistical operations, and output data format consistency for operations across disparate climate data collections, for example, MERRA-2, ERA-Interim, CFSR, 20CR, JRA-25, and JRA-55.

The collections reference model 425 may be referenced by a client application through the OAIS order call, which may be mapped to a Get Variable By Collection (GetVarByCollection( . . . )) method with arguments including one or more of the disparate reanalysis collections upon which to operate, a time span, a time interval, a spatial extent, a spatial resolution, a vertical extent, and a vertical average. In greater detail, the arguments may include:

time_span="time_span=end time-start time"; which designates a time span in which a canonical operation may be applied. The end time and start time may be in the form of yyyymmdd, for example 19800101-19790101.

time_interval="time_interval_type(time_interval_start, time_interval_end)" which designates a time interval type, a time interval start, and a time interval end. A special case is "time_interval=fullinterval_end(fullspan)" which specifies a full span of the collection.

spatial_extent="spatial_extent=-ul lat, ul lon, lr lat, lr lon"; where the values are an upper latitude and an upper longitude of an upper corner of a bounding box, and a lower latitude and a lower longitude of a lower opposite corner of the bounding box, for example, −125.0965, 24.7743, −66.9008, 50.4254.

spatial_resolution="spatial_resolution=degrees"; A special case is "spatial_resolution=native" which designates a default spatial resolution of a data collection vertical_extent="vertical_extent=fullextent"; which specifies a number of vertical levels to include, and where the "fullextent" arguments indicates that all vertical levels may be included.

vertical_avg_flag="vertical_avg_flag=false"; indicates whether an average may be calculated over the specified vertical levels.

Figure 7:
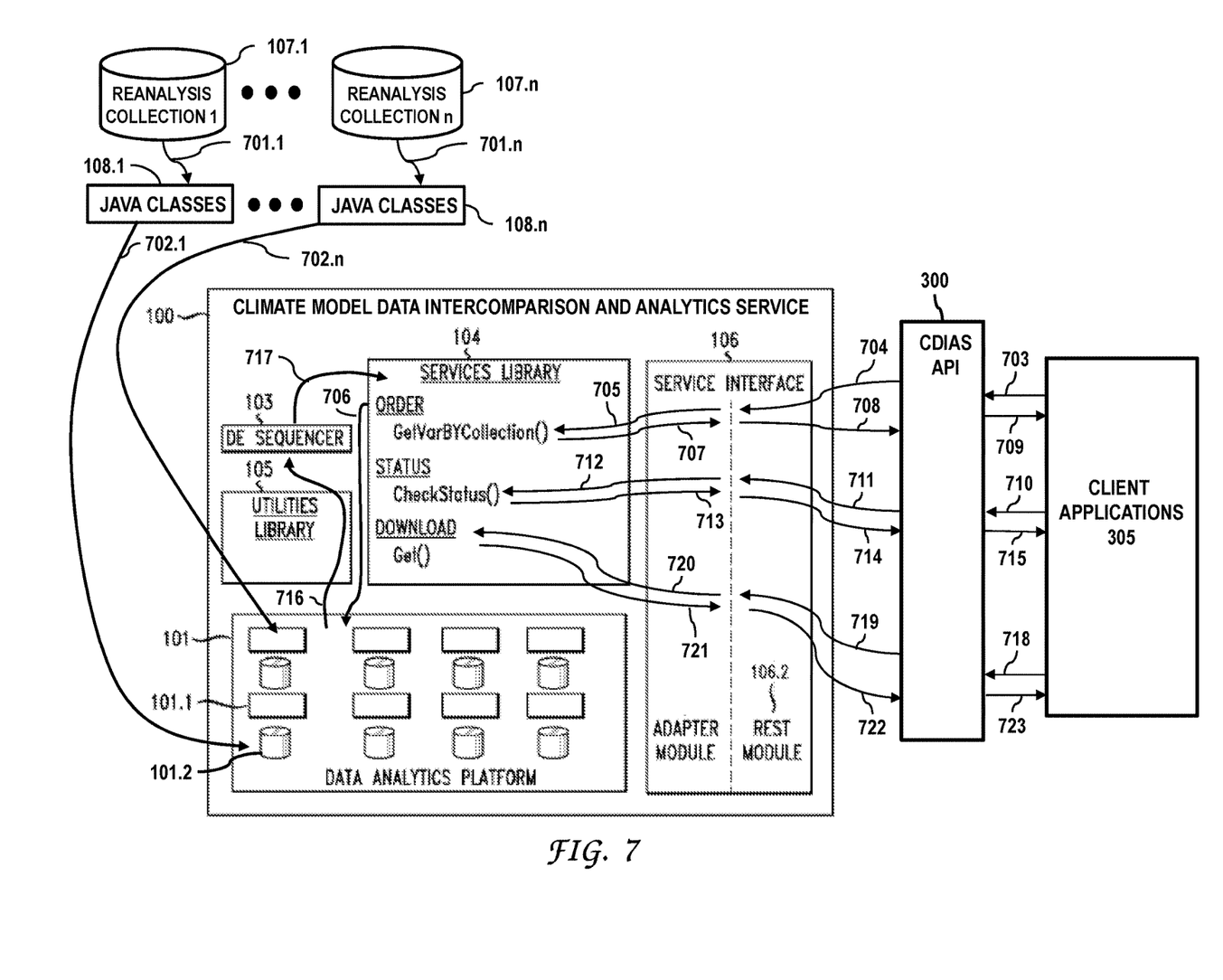
FIG. 7 illustrates a basic workflow of interactions among the components of the climate data intercomparison and analytics service, client applications, and the climate data intercomparison and analytics service API.

FIG. 7 illustrates a basic workflow of interactions among the components of the climate data intercomparison and analytics service 100, the client applications 305 and the CDIAS API 300. In a first step 701.1-701.n, climate reanalysis source data 107.1-107.n from one or more of the one or more of the MERRA-2, ERA-Interim, CFSR, 20CR, JRA-25, and JRA-55 climate data collections, Reanalysis collection 1-Reanalysis collection n is provided to the associated Java classes 108.1-108.n, which transform the source NetCDF files into MapReduce sequence files and loads 702.1-702.n the sequence files into the Hadoop filesystem of the data analytics platform.

In an example request for a computed data object, the client applications 305 may submit an order service request 703 to the CDIAS API 300 indicating the operation to perform and parameters that further specify the request. The CDIAS API 300 may then map the service request to an appropriate order method 704 recognized by the service interface 106, for example, http://<base_URL>/(order.php?service=<service_name>&request=<operation>&parameters=<parameters>. The service interface 106 in turn may map the request to a recognized order method 705 in the basic or extended utilities 104, in this case the GetVarByCollection( . . . ) method, which may launch 706 the operation as a MapReduce computation on the data analytic platform 101 and return 707 a session identifier (ID) through the service interface 106 which may then map the ID 708 to the order method requested by the CDIAS API 300, which in turn may map the ID 709 to the client applications order service request.

Once the order request is launched, the client applications 305 may request status information 710 which the CDIAS API 300 may then map to an appropriate status order 711 recognized by the service interface 106, for example, http://<base_URL>/(status.php?service=<service_name>&request=<operation>&parameters=<parameters>. The service interface 106 in turn may map the status order to the CheckStatus method 712 with the session ID to monitor the progress of the order request. The system interface 106 may receive the status 713, and may map the status 714 to the request submitted by the CDIAS API 300, which in turn may map the status 715 to the client applications status request. When the order request is finished, the computed data object 716 may be desequenced by the de-sequencer 103 and the desequenced data object 717 may be converted to a NetCDF file by the services library 104 and prepared for retrieval. The client application 305 may then submit a download request 714 to the CDIAS API 300, which the CDIAS API 300 may then map to a download order 719 recognized by the service interface 106, for example, http://<base_URL>/(down load.php?service=<service_name>&request=<operation>&parameters=<parameters>. The service interface 106 may map the download order to a Get method 720. The Get method may provide the data 721 to the system interface 106 which may then map the data 722 to the CDIAS API 300, which in turn may map the data 723 to the client applications 305.

Another exemplary order method may be an Uncertainty Quantification (UncertQuant( . . . )) method applicable to the MERRA-2, ERA-Interim, CFSR, 20CR, JRA-25, and JRA-55 climate data collections. Uncertainty analysis pervades all levels of climate impact assessments and climate data analysis and preparing data for uncertainty quantification is presently a particularly time-consuming step. The CDIAS API 300 is an effort to make data quickly and easily ready for assessment and provides an Uncertainty Quantification Package (UQP) that includes that includes context-sensitive peer products that can be used to characterize uncertainty. The following example demonstrates a possible use of a UQP for evaluating a particular climate measurement, for example, global precipitation, among multiple reanalysis datasets.

The disclosed exemplary UncertQuant( . . . ) method may be initiated by the client application submitting an order service request to the CDIAS API 300 indicating the uncertainty quantification operation and parameters that further specify the request, for example, one or more climate measurements, one or more of the reanalysis collections upon which to operate, a multi-year temporal span, a specified year within the multi-year temporal span, and a same specified time period within each of the years. The CDIAS API 300 may then map the service request to an appropriate order method recognized by the service interface, in the form of: http://<base_URL>/

(order.php?service=<service_name>&request=<operation>&parameters=<parameters>. The service interface 106 in turn may map the request to a recognized order method in the basic or extended utilities 104, in this case an UncertQuant( . . . ) method, which may launch the operation as a MapReduce computation on the data analytic platform 101 and return a session identifier (ID) through the service interface 106 which may then map the ID to the order method requested by the CDIAS API 300, which in turn may map the ID to the client applications order service request. The client applications 305 may request status information and submit a download request similar to other order requests.

Using precipitation as an exemplary climate measurement, the UncertQuant( . . . ) method may include the following operations:

1) Calculating a global average of the climate measurement, for example, precipitation, from the specified reanalysis collections.

2) Calculate global average precipitation from two observed climate records, for example, the Global Precipitation Climatology Project (GPCP) which collects data from rain gauge stations, satellites, and sounding observations, and the Climate Prediction Center Merged Analysis of Precipitation (CMAP) which produces observations of rain gauges merged with prediction estimates from satellite based algorithms.

3) Calculate global ensemble average for the reanalysis collections.

4) Generate line plots to show long-term variability of global precipitation in each dataset.

5) Generate a Taylor diagram to summarize the similarity of global precipitation patterns between the GPCP, CMAP, and other datasets.

Figure 8:
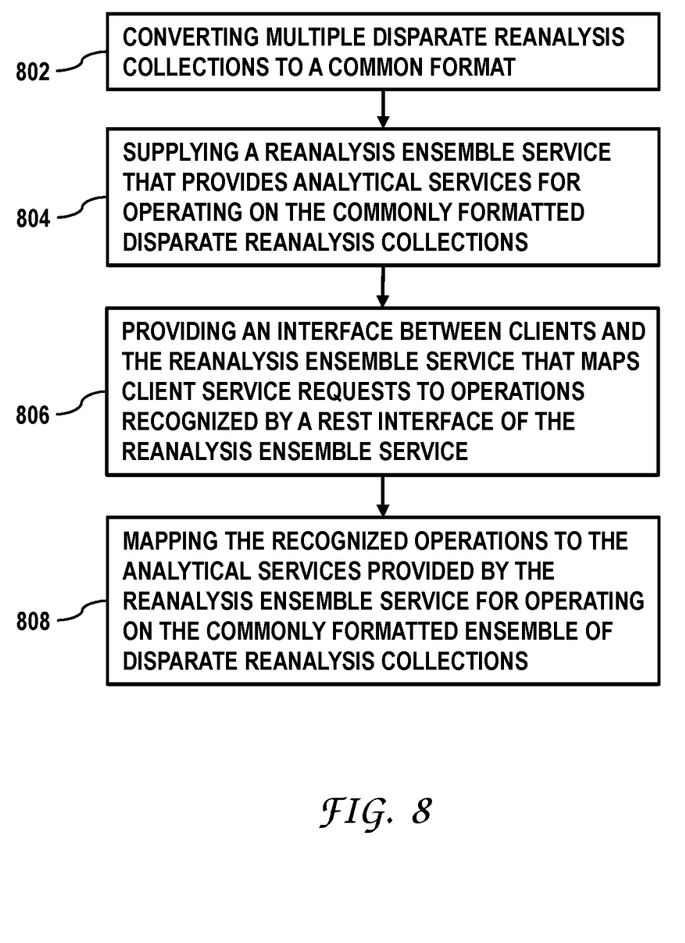
FIG. 8 shows a flow chart illustrating an exemplary method according to the disclosed embodiments.

Having disclosed some basic system components and concepts, the disclosure now turns to the exemplary method illustrated by the flow chart shown in FIG. 8. For the sake of clarity, the method is described in terms of the exemplary system as shown in FIG. 3 configured to practice the method. The method elements outlined herein are exemplary and can be implemented in any combination thereof, including combinations that exclude, add, or modify certain elements.

As shown in block 802, the method includes converting multiple disparate reanalysis collections to a common format. The multiple disparate reanalysis collections may be converted using individual sets of Java classes 108.1-108.$n$ specific to each reanalysis data collection. The method further includes supplying a climate data intercomparison and analytics service that provides analytical services for operating on the commonly formatted disparate reanalysis collections, as shown in block 804.

As shown in block 806, the method further includes providing an interface between clients and the climate data intercomparison and analytics system that maps client service requests to operations recognized by a REST interface of the climate data intercomparison and analytics service. The interface may include a set of basic utilities that provide a one-to-one correspondence to services provided by the climate data intercomparison and analytics system, and the interface may also include a set of extended utilities that may combine a collection of utilities, basic, extended, or both, OAIS Reference Model web services, ingest, query, order, download, execute, and status, the above mentioned canonical operations, individually or in combination, or any other combination of services provided by the climate data intercomparison and analytics service to perform a specific task or create higher order products.

As shown in block 808, the method still further includes mapping the recognized operations to the analytical services provided by the climate data intercomparison and analytics service for operating on the commonly formatted ensemble of disparate reanalysis collections.

Various embodiments of the disclosure are described in detail below. While specific implementations are described, it should be understood that this is done for illustration purposes only. Other components and configurations may be used without parting from the spirit and scope of the disclosure.

Figure 9:
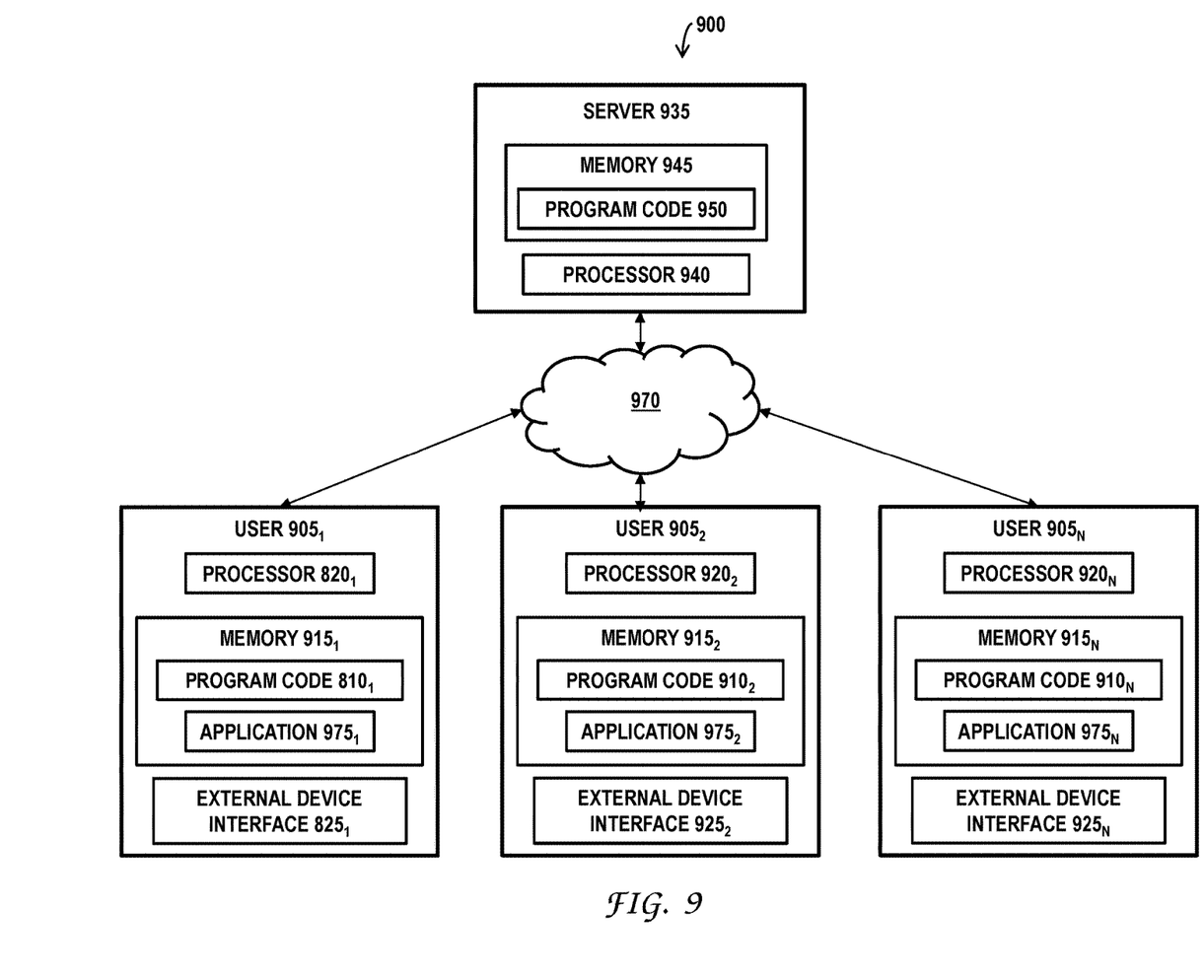
FIG. 9 shows a schematic illustration of an exemplary computing system for practicing the disclosed embodiments.

FIG. 9 shows a schematic illustration of an exemplary computing system 900 for practicing the disclosed embodiments. The system 900 may include one or more user terminals $905_1$-$905_n$. Each user terminal $905_1$-$905_n$ may include computer readable program code $910_1$-$910_n$ stored on at least one non-transitory computer readable medium for carrying out and executing the processes described herein. The computer readable medium may include memories $915_1$-$915_n$, and in alternate aspects, the computer readable program code $910_1$-$910_n$ may be stored in memories external to, or remote from, user terminals $905_1$-$905_n$. Memories $915_1$-$915_n$ may include magnetic media, semiconductor media, optical media, or any media which is readable and executable by a computer. Each user terminal $905_1$-$905_n$ may also include a processor $920_1$-$920_n$ for executing the computer readable program code $910_1$-$910_n$ in a sequential processing configuration. In some embodiments, each user terminal $905_1$-$905_n$ may include multiple processors $920_1$-$920_n$ for executing the computer readable program code $910_1$-$910_n$ in a parallel processing configuration.

At least one embodiment may be limited to a single autonomous user terminal 905, while other embodiments may include multiple user terminals $905_1$-$905_n$. In some embodiments, one or more of the user terminals $905_1$-$905_n$ may be connected to each other and optionally to a server 935 through a network 970. The computer readable program code $910_1$-$910_n$ of one or more of the user terminals may invoke or operate an application $975_1$-$975_n$ for accessing other user terminals and the server 935.

The server 935 may include a processor 940, and memory 945 storing computer program code 950 for generally operating the server 935 to provide the computing system operations described herein. In some embodiments, the at least one server 935 may be implemented by a cloud computing service, and the processes described herein may be provided in the form of software as a service (SaaS).

The various embodiments described above are provided by way of illustration only and should not be construed to limit the scope of the disclosure. For example, the principles herein apply generally to any large, standardized data set. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A method of providing a climate data intercomparison and analytics service application programming interface (CDIAS-API), comprising:
    implementing a set of basic utilities configured to map calls from client applications to single service-side methods operating on one or more disparate climate reanalysis datasets by the climate data intercomparison and analytics service;
    implementing a set of extended utilities comprising scripts that call on one or more of:
    a set of canonical operations; and
    one or more basic utilities; and
    implementing a collections reference model configured to provide semantic alignment of variable names, method alignment of statistical operations, and output data format consistency for operations across the one or more disparate climate reanalysis datasets; and further comprising configuring the calls from client applications as Open Archival information System Reference Model calls including ingest, query, order, download, execute, and status methods.

2. The method of claim 1, comprising configuring the single service-side methods as web services recognized by a service interface of the climate data intercomparison and analytics service.

3. The method of claim 1, wherein the plurality of disparate climate reanalysis datasets from different sources comprises NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), and Japanese 55-year Reanalysis (JRA-55).

4. The method of claim 1, wherein the canonical operations comprise:
    a seasonal maximum operation that converts monthly climate variable data to seasonal climate variable data and selects a maximum for selected variables for each grid of 30 or more years over a specified spatial extent;
    a seasonal average operation that converts monthly climate variable data to seasonal climate variable data over a specified time span;
    a vertical average of specified variables across a specified number of vertical levels;
    a spatial average of specified variables over a specified spatial-extent;
    an anomaly determination including a deviation of one or more variables at a certain time interval from an average of the one or more variables over a longer time interval; and
    a standard deviation of one or more variables from a specified set of data values from the combination of the different sourced common format files.

5. The method of claim CDIAS-API of claim 1, comprising:
    referencing the collections reference model by the client application through the Open Archival information System Reference Model OAIS order call; and
    mapping the Open Archival information System Reference Model OAIS order call to a Get Variable By Collection (GetVarByCollection( . . . )) method with arguments comprising one or more of the disparate reanalysis collections upon which to operate.

6. The method of claim 5, wherein the arguments further comprise a time span, a time interval, a spatial extent, a spatial resolution, a vertical extent, and a vertical average.

7. A system for providing climate data intercomparison and analytics services comprising:
    a processor;
    a non-transitory computer readable storage medium storing instructions which when executed by the processor, cause the system to:
        convert a plurality of disparate reanalysis collections from different sources to a common format using individual conversion utilities configured to convert a specific one of the plurality of disparate climate reanalysis datasets from different sources to common format files that are temporally and spatially registered; and
    instantiate a climate data intercomparison and analytics service application programming interface (CDIAS-API), comprising:
        a set of basic utilities configured to map calls from client applications to single service-side methods operating on one or more disparate climate reanalysis datasets by the climate data intercomparison and analytics service;
        a set of extended utilities comprising scripts that call on one or more of:
        a set of canonical operations; and
        one or more basic utilities; and
        a collections reference model configured to provide semantic alignment of variable names, method alignment of statistical operations, and output data format consistency for operations across the one or more disparate climate reanalysis datasets.

8. The system for providing climate data intercomparison and analytics services of claim 7, wherein the calls from client applications comprise Open Archival information System Reference Model calls including ingest, query, order, download, execute, and status methods.

9. The system for providing climate data intercomparison and analytics services of claim 8, wherein the collections reference model is configured to be referenced by the client application through the Open Archival information System Reference Model OAIS order call, which is mapped by the CDIAS-API to a Get Variable By Collection (GetVarByCollection( . . . )) method with arguments comprising one or more of the disparate reanalysis collections upon which to operate.

10. The system for providing climate data intercomparison and analytics services of claim 9, wherein the arguments further comprise a time span, a time interval, a spatial extent, a spatial resolution, a vertical extent, and a vertical average.

11. The system for providing climate data intercomparison and analytics services of claim 7, wherein the single service-side methods comprise web services recognized by a service interface of the climate data intercomparison and analytics service.

12. The system for providing climate data intercomparison and analytics services of claim 7, wherein the plurality of disparate climate reanalysis datasets from different sources comprises NASA Modern Era Reanalysis for Research and Applications Version-2 (MERRA-2), European Centre for Medium-Range Forecasts ECMWF Interim Reanalysis (ERA-Interim), NOAA NCEP Climate Forecast System Reanalysis (CFSR), NOAA ESRL 20th Century Reanalysis (20CR), Japanese 25-year Reanalysis (JRA-25), and Japanese 55-year Reanalysis (JRA-55).

\* \* \* \* \*